(12) United States Patent
Gómez Timoneda et al.

(10) Patent No.: US 10,286,845 B2
(45) Date of Patent: May 14, 2019

(54) MIRROR ASSEMBLY FOR A VEHICLE

(71) Applicant: Fico Mirrors, S.A.U., Barcelona (ES)

(72) Inventors: David Gómez Timoneda, Barcelona (ES); Frédéric Lorival, Torfou (FR); Robert López Galera, Barcelona (ES); Oriol Biosca Yuste, Catalonia (ES)

(73) Assignee: FICO MIRRORS, S.A.U., Barcelona (ES)

( * ) Notice: Subject to any disclaimer, the term of this patent is extended or adjusted under 35 U.S.C. 154(b) by 4 days.

(21) Appl. No.: 15/456,862

(22) Filed: Mar. 13, 2017

(65) Prior Publication Data

US 2017/0259742 A1    Sep. 14, 2017

(30) Foreign Application Priority Data

Mar. 14, 2016   (EP) .................................. 16382112

(51) Int. Cl.
| | |
|---|---|
| *B60R 1/08* | (2006.01) |
| *G02B 7/182* | (2006.01) |
| *G02B 26/02* | (2006.01) |
| *B60Q 1/26* | (2006.01) |
| *B60R 1/12* | (2006.01) |
| *B62J 29/00* | (2006.01) |
| *G02F 1/137* | (2006.01) |

(52) U.S. Cl.
CPC ............ *B60R 1/087* (2013.01); *B60Q 1/2665* (2013.01); *B60R 1/088* (2013.01); *B60R 1/12* (2013.01); *G02B 7/182* (2013.01); *G02B 26/023* (2013.01); *B60R 1/083* (2013.01); *B60R 1/086* (2013.01); *B60R 2001/1215* (2013.01); *B62J 29/00* (2013.01); *G02B 26/02* (2013.01); *G02F 1/13718* (2013.01)

(58) Field of Classification Search
CPC  B60R 1/087; B60R 1/088; B60R 1/12; B60R 1/083; B60R 1/086; B60R 2001/1215; B60Q 1/2665; B62J 29/00; G02B 7/182; G02B 26/023; G02B 26/02; G02F 1/13718
USPC .......................................... 359/871
See application file for complete search history.

(56) References Cited

U.S. PATENT DOCUMENTS 4,488,777 A * 12/1984 Bauer ..................... B60R 1/087
                                                          359/603
5,223,814 A *  6/1993 Suman .................... B60R 1/088
                                                          250/200

(Continued)

FOREIGN PATENT DOCUMENTS

WO       2007029137 A1    3/2007

OTHER PUBLICATIONS

European Search Report for related European Application No. 161382112.7 dated Jun. 23, 2016; 8 pages.

*Primary Examiner* — Frank G Font
(74) *Attorney, Agent, or Firm* — Cantor Colburn LLP

(57) ABSTRACT

A mirror assembly for a vehicle comprises a switchable reflective element that can change between a high reflection state and a low reflection state. The mirror assembly also includes a controller communicating with the switchable reflective element, the controller being able to change the switchable reflective element between a high reflection state and a low reflection state. The mirror assembly further includes a housing configured for attachment to the vehicle and housing at least the switchable reflective element.

11 Claims, 3 Drawing Sheets

(56) References Cited

U.S. PATENT DOCUMENTS

| | | | | |
|---|---|---|---|---|
| 6,000,823 | A * | 12/1999 | Desmond | B60Q 1/2665 |
| | | | | 362/135 |
| 6,089,721 | A * | 7/2000 | Schierbeek | B60R 1/088 |
| | | | | 359/267 |
| 6,369,868 | B1 * | 4/2002 | Fan | B82Y 15/00 |
| | | | | 349/115 |
| 6,674,504 | B1 | 1/2004 | Li et al. | |
| 7,679,809 | B2 * | 3/2010 | Tonar | B60R 1/088 |
| | | | | 359/265 |
| 8,248,680 | B2 * | 8/2012 | Brown | B60R 1/088 |
| | | | | 359/238 |
| 9,834,146 | B2 * | 12/2017 | VanderPloeg | B60R 1/088 |
| 2002/0140884 | A1 * | 10/2002 | Richard | B60R 1/088 |
| | | | | 349/113 |
| 2007/0184284 | A1 * | 8/2007 | Varaprasad | B32B 17/06 |
| | | | | 428/426 |
| 2009/0002822 | A1 | 1/2009 | Tonar et al. | |
| 2010/0110523 | A1 * | 5/2010 | Varaprasad | B60R 1/089 |
| | | | | 359/273 |
| 2010/0277786 | A1 * | 11/2010 | Anderson | B60R 1/088 |
| | | | | 359/247 |
| 2011/0273659 | A1 * | 11/2011 | Sobecki | B60R 1/088 |
| | | | | 349/195 |
| 2014/0268351 | A1 * | 9/2014 | VanderPloeg | B60R 1/088 |
| | | | | 359/604 |
| 2014/0340728 | A1 * | 11/2014 | Taheri | G02B 27/281 |
| | | | | 359/250 |
| 2015/0277203 | A1 | 10/2015 | VanderPloeg et al. | |
| 2017/0349103 | A1 * | 12/2017 | Tonar | B60R 1/088 |

\* cited by examiner

MIRROR ASSEMBLY FOR A VEHICLE

CROSS-REFERENCES TO RELATED APPLICATIONS

This application claims priority to European patent application no. 16382112.7, filed on Mar. 14, 2016, which is incorporated herein by reference, in its entirety.

BACKGROUND OF THE INVENTION

The present invention relates to a mirror assembly for a vehicle, belonging to the field of rear view mirror assemblies.

It is known in the art providing display mirror assemblies that may operate in a mirror mode or in a display mode.

US 2015/0277203 A1, referred to an "Automatic display mirror assembly" discloses a display mirror assembly for a vehicle which includes an electrochromic cell, a switchable reflective element, a display module, an ambient light sensor, and a controller. The controller automatically selects a display mode or a mirror mode in response to a detected ambient light level. In a display mode, the controller activates the display module, sets the switchable reflective element to a low reflection mode, and sets the electrochromic cell to a clear state with minimum attenuation. In a mirror mode, the controller deactivates the display module, sets the switchable reflective element to a high reflection mode, and varies attenuation by the electrochromic cell.

One drawback of this configuration of display mirror assembly is that it requires an additional element, such as an electrochromic cell, to control the amount of reflected light, thus attenuating the light passing therethrough.

SUMMARY OF THE INVENTION

Therefore, the object of the invention is to provide a mirror assembly that overcomes the mentioned drawback of the prior art configurations.

The invention provides a mirror assembly for a vehicle comprising:
  a switchable reflective element, that can change between a high reflection state and a low reflection state;
  a controller communicating with the switchable reflective element, the controller being able to change the switchable reflective element between a high reflection state and a low reflection state; and
  a housing configured for attachment to the vehicle and housing at least the switchable reflective element.

According to an embodiment of the invention, the reflection state of the switchable reflective element can be regulated by the controller to obtain intermediate reflection states between the high reflection state and the low reflection state. This configuration of the mirror assembly allows the regulation of dimming without using any additional element.

Other advantageous embodiments will be described in the dependent claims.

BRIEF DESCRIPTION OF THE DRAWINGS

For a more complete understanding of the present invention, it will be described below in greater detail, making reference to the attached drawings, in which.

DETAILED DESCRIPTION OF THE INVENTION

Figure 1:
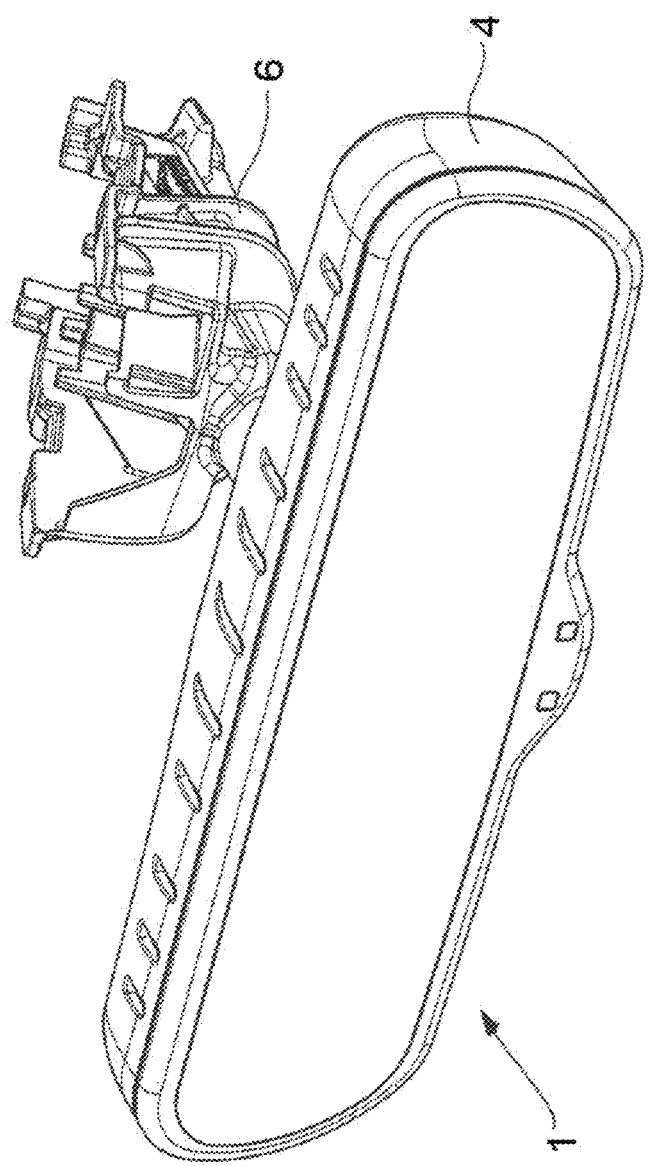
FIG. 1 is a perspective view of the mirror assembly for a vehicle of the invention.

FIG. 1 is a perspective view of the mirror assembly 1 of the invention, in which its housing 4 and its mounting means 6 can be seen. The mounting means 6 serves to attach the mirror assembly 1 to the vehicle (for instance, to the windshield or another element).

The mirror assembly 1 for a vehicle of the invention comprises:
  a switchable reflective element 2, that can change between a high reflection state and a low reflection state;
  a controller communicating with the switchable reflective element 2, the controller being able to change the switchable reflective element 2 between a high reflection state and a low reflection state; and
  a housing 4 configured for attachment to the vehicle and housing at least the switchable reflective element 2.

According to an embodiment of the invention, the high reflection state of the switchable reflective element 2 has a reflectivity greater than 40%, and the low reflection state of the switchable reflective element 2 has a reflectivity of less than 10% and a transmissivity greater than 80%.

Some examples of switchable reflective elements suitable for the invention can be found in U.S. Pat. No. 6,674,504 B1.

Figure 7:
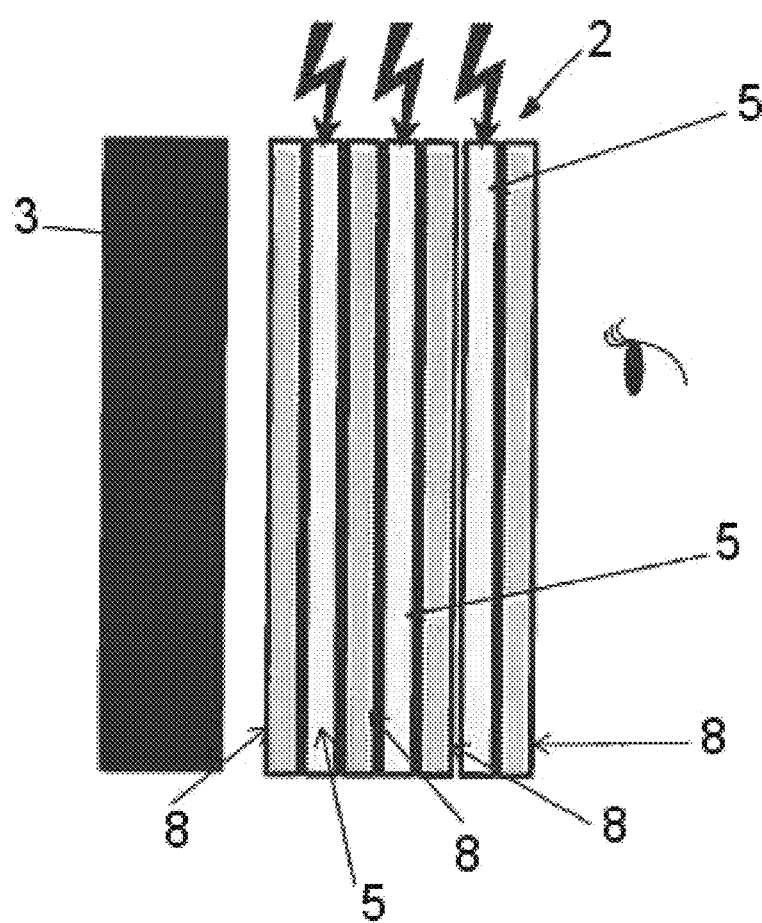
FIG. 7 is a schematic representation of a switchable reflective element that comprises several individual switchable reflective elements, together with the display.

According to another embodiment of the invention, the switchable reflective element 2 comprises several individual switchable reflective elements 5 having only two possible states. a high reflection state and a low reflection state and arranged in parallel (see FIG. 7). Depending on the desired reflection state for the switchable reflective element 2, the necessary number of individual switchable reflective elements 5 will be activated or deactivated, thus regulating the reflection state of the switchable reflective element 2 to obtain intermediate reflection states between the high reflection state and the low reflection state.

In FIG. 7 it can also be seen that the switchable reflective element 2 also comprises a number of glass layers 8 such that the individual switchable reflective elements 5 are placed between two glass layers 8. The layers corresponding to the individual switchable reflective elements 5 can be made of ITO+a switchable reflective element+ITO (ITO standing for indium tin oxide).

According to another embodiment of the invention, it is also possible to obtain intermediate reflection states of the switchable reflective element 2 between the high reflection state and the low reflection state. The regulation is made by the controller.

The mirror assembly 1 can additionally comprise at least one ambient light sensor for sensing an ambient light level and giving an ambient light signal representative of the sensed ambient light level. The ambient light sensor also communicates with the controller, such that the regulation of the reflection state of the switchable reflective element 2 depends on the ambient light signal.

In one embodiment of the invention the mirror assembly 1 comprises two ambient light sensors, such that one ambient light sensor senses an ambient light level inside the vehicle and one ambient light sensor senses an ambient light level outside the vehicle.

According to another option, the ambient light sensor communicates with the controller, and the controller compares the ambient light signal with a threshold value such that:

when the ambient light signal exceeds the threshold value the controller switches the switchable reflective element 2 to the low reflection state, and when the ambient light signal does not exceed the threshold value the controller switches the switchable reflective element 2 to the high reflection state.

In this option the reflection states of the switchable reflective element 2 can be automatically switched from the high reflection state to the low reflection state and vice versa.

According to another option, the reflection state of the switchable reflective element 2 can be manually regulated by a user by means of a user interface.

The user interface can be placed on the housing 4 of the mirror assembly 1. According to another options, it can be separated from the housing 4 of the mirror assembly 1 (for instance, on the levers of the steering wheel).

According to another embodiment, the mirror assembly 1 additionally comprises a display 3 positioned behind the switchable reflective element 2 for displaying an image visible through the switchable reflective element 2. The display 3 is able to change between an activated state and a deactivated state, and to communicate with the controller, such that the display 3 can be deactivated when the switchable reflective element is in the high reflection state, in the low reflection state or in any intermediate reflection state.

Figure 2:
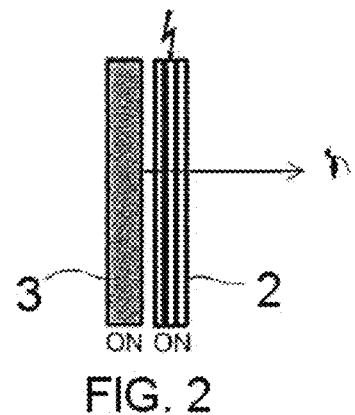
FIG. 2 is a schematic representation of the switchable reflective element and the display of an embodiment of the invention, in a display mode.
Figure 3:
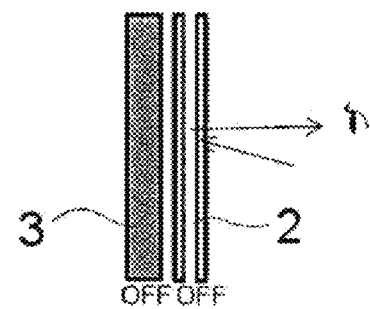
FIG. 3 is a schematic representation of the switchable reflective element and the display of an embodiment of the invention, in a mirror mode.

FIGS. 2 and 3 show the switchable reflective element 2 and the display 3 of an embodiment of the invention, in a display mode and in a mirror mode, respectively.

In the basic function of the mirror assembly 1, when the switchable reflective element 2 is activated by the driver (for instance, through a button or any kind of human-machine interface), the display 3 is switched ON and the switchable reflective element 2 is switched to its low reflection state (FIG. 2), and the driver is able to see the image from the display 3 through the switchable reflective element 2 (display mode).

When the switchable reflective element 2 is de-activated by the driver (for instance, through a button or any kind of human-machine interface), the display 3 is switched OFF and the switchable reflective element 2 is switched to its high reflection state (FIG. 3), and the driver is able to see the light reflected by the switchable reflective element 2 (mirror mode).

The mirror assembly 1 can comprise an actuator 7 for moving the switchable reflective element 2 between a first position and a second position, the second position being tilted with respect to the first position.

Figure 4:
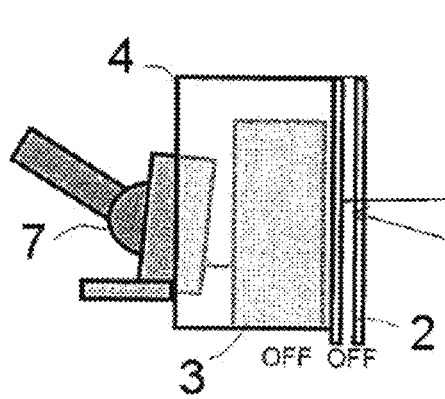
FIG. 4 is a schematic representation of the actuator, the switchable reflective element and the display of an embodiment of the invention in a first position.
Figure 5:
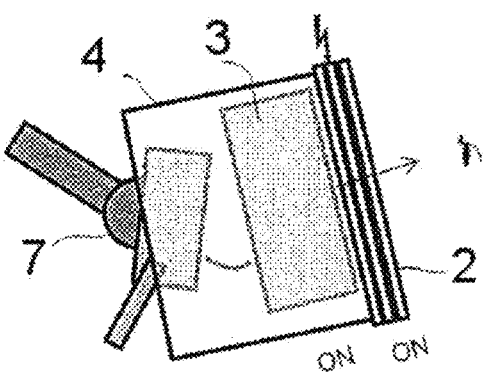
FIG. 5 is a schematic representation of the actuator, the switchable reflective element and the display of an embodiment of the invention in a second position.

For the embodiments including a display 3, the actuator 7 can also move the display 3 together with the switchable reflective element 2, as shown in FIGS. 4 and 5.

FIG. 4 shows the actuator 7, the switchable reflective element 2 and the display 3 of an embodiment of the invention in a first position, where both the switchable reflective element 2 and the display 3 are in a deactivated state.

FIG. 5 shows the actuator 7, the switchable reflective element 2 and the display 3 of an embodiment of the invention in a second position, where both the switchable reflective element 2 and the display 3 are in an activated state.

In the embodiment of FIGS. 4 and 5, when the switchable reflective element 2 is activated by the driver through the actuator 7 (such as a lever or any kind of human-machine interface), it means at the same time a tilting movement, as the second position is tilted with respect to the first position. The display 3 is switched ON and the switchable reflective element 2 is switched to the low reflection state, and the driver is able to see the image from the display 3 through the switchable reflective element 2 (FIG. 5).

When the switchable reflective element 2 is deactivated by the driver through the actuator 7 (such as a lever or any kind of human-machine interface), it means at the same time a tilting movement that lets the driver see the image from the rear part of the vehicle. The display 3 is switched OFF and the switchable reflective element 2 is switched to the high reflection state, and the driver is able to see the light reflected by the switchable reflective element 2 (FIG. 4).

Figure 6:
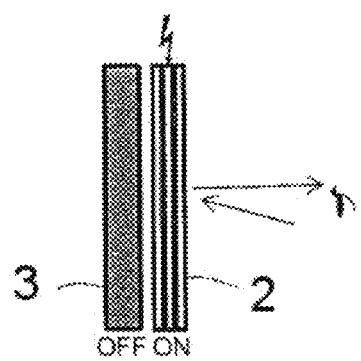
FIG. 6 is a schematic representation of the switchable reflective element and the display of an embodiment of the invention, in a dimming mirror mode.

FIG. 6 shows the switchable reflective element 2 and the display 3 of an embodiment of the invention, in a dimming mirror mode.

The mirror assembly 1 can also comprise a switch element to activate and deactivate only the display 3, independently of the activation and deactivation of the switchable reflective element 2. In FIG. 6 it can be seen that the switchable reflective element 2 is in the low reflection state and the display 3 has been switched OFF (for instance, by means of a switch element). In this situation, if the display 3 is dark, the light is reflected by the display 3, obtaining a dimming effect, in which only a small part of the light received by the switchable reflective element 2 reaches the driver, in this way avoiding moving the mirror assembly 1.

Although the present invention has been fully described in connection with preferred embodiments, it is evident that modifications may be introduced within the scope thereof, not considering this as limited by these embodiments, but by the contents of the following claims.

The invention claimed is:

1. A mirror assembly for a vehicle, comprising:
   a switchable reflective element, that can change between a high reflection state and a low reflection state, the switchable reflective element comprises a plurality of individual switchable reflective elements each configured to change only between the high reflection state and the low reflection state, and wherein the plurality of individual switchable reflective elements are arranged in parallel to one-another to obtain intermediate reflection states between the high reflection state and the low reflection state of the switchable reflective element;
   a controller communicating with the switchable reflective element, the controller being able to change the switchable reflective element between the high reflection state and the low reflection state;
   a housing configured for attachment to the vehicle and housing at least the switchable reflective element;
   at least one ambient light sensor for sensing an ambient light level and producing an ambient light signal representative of the sensed ambient light level, the ambient light sensor also communicating with the controller, the controller comparing the ambient light signal with a threshold value such that:

when the ambient light signal exceeds the threshold value the controller automatically switches the switchable reflective element to the low reflection state, and when the ambient light signal does not exceed the threshold value the controller automatically switches the switchable reflective element to the high reflection state; and a user interface adapted to provide manual switching between the high and low reflection states overriding and independent of the automatic switching.

2. The mirror assembly according to claim 1, wherein the high reflection state has a reflectivity greater than 40%, the low reflection state has a reflectivity of less than 10%, and the low reflection state has a transmissivity greater than 80%.

3. The mirror assembly according to claim 1, wherein the high and low reflection states of the switchable reflective element can be regulated by the controller to obtain the intermediate reflection states between the high reflection state and the low reflection state.

4. The mirror assembly according to claim 1, wherein the at least one ambient light sensor is two ambient light sensors, such that one ambient light sensor senses an ambient light level inside the vehicle and the other ambient light sensor senses an ambient light level outside the vehicle.

5. The mirror assembly according to claim 3, wherein the user interface is located on the housing of the mirror assembly.

6. The mirror assembly according to claim 1, additionally comprising a display positioned behind the switchable reflective element and being visible through the switchable reflective element, the display being able to change between an activated display mode and a deactivated mirror mode and communicating with the controller, such that the display can be in the mirror mode when the switchable reflective element is in the high reflection state and in the display mode when the switchable reflective element is in the low reflection state.

7. The mirror assembly according to claim 6, additionally comprising an actuator for moving the switchable reflective element between a first position and a second position, the second position being tilted with respect to the first position.

8. The mirror assembly according to claim 7, wherein the actuator also moves the display together with the switchable reflective element.

9. The mirror assembly according to claim 8, wherein the actuator is configured to activate and deactivate the switchable reflective element and the display at the same time.

10. The mirror assembly according to claim 1, additionally comprising:

a mounting means extending between and engaged to the vehicle and the housing; and an actuator adapted to tilt the switchable reflective element with respect to the mounting means, and between a first position and a second position.

11. A mirror assembly adapted to be installed in a vehicle, the mirror assembly comprising:

a plurality of switchable reflective elements, each configured to change between a high reflection state and a low reflection state;

a plurality of glass layers, with each glass layer being separated from an adjacent glass layer of the plurality of glass layers by a respective one of the plurality of switchable reflective elements; and a controller communicating with each one of the plurality of switchable reflective elements, and configured to effect change of each one of the plurality of switchable reflective elements between a high reflection state and a low reflection state.

* * * * *